United States Patent [19]
Hamanaka et al.

[11] Patent Number: 5,602,203
[45] Date of Patent: Feb. 11, 1997

[54] OLEFIN RESIN COMPOSITION

[75] Inventors: Tatsuo Hamanaka, Ichihara; Tadashi Hikasa, Sodegaura; Yoshitsugu Takai, Kyoto; Tetsuya Yamada, Otsu, all of Japan

[73] Assignee: Sumitomo Chemical Company, Limited, Osaka, Japan

[21] Appl. No.: 396,580

[22] Filed: Mar. 1, 1995

Related U.S. Application Data

[63] Continuation-in-part of Ser. No. 148,778, Nov. 26, 1993, abandoned.

[30] Foreign Application Priority Data

Nov. 26, 1992 [JP] Japan ................... 4-316903

[51] Int. Cl.$^6$ ................................ C08F 255/02
[52] U.S. Cl. ..................... 525/74; 525/75; 525/77; 525/79; 525/194; 525/207; 525/240
[58] Field of Search ............... 525/74, 240, 75, 525/77, 79, 194, 207

[56] References Cited

U.S. PATENT DOCUMENTS

| | | | |
|---|---|---|---|
| 3,806,558 | 4/1974 | Fischer | 525/198 |
| 4,146,590 | 3/1979 | Yamamoto et al. | 525/168 |
| 4,212,787 | 7/1980 | Matsuda et al. | 525/311 |
| 4,727,120 | 2/1988 | Nogues | 525/168 |
| 4,735,992 | 4/1988 | Nogues | 525/64 |
| 4,822,688 | 4/1989 | Nogues | 428/458 |
| 4,957,968 | 9/1990 | Adur et al. | 525/74 |
| 5,118,753 | 6/1992 | Hikasa et al. | 524/525 |
| 5,225,483 | 7/1993 | Datta | 525/73 |

FOREIGN PATENT DOCUMENTS

| | | |
|---|---|---|
| 336780 | 10/1989 | European Pat. Off. . |
| 4419863 | 8/1967 | Japan . |
| 2-36248 | 2/1990 | Japan . |

*Primary Examiner*—Irina S. Zemel
*Attorney, Agent, or Firm*—Cushman Darby & Cushman IP Group of Pillsbury Madison & Sutro, LLP

[57] ABSTRACT

An olefinic resin composition which comprises 100 parts by weight of a thermoplastic olefin elastomer consisting of a polyolefin resin and an olefinic copolymer rubber and 0.5 to 30 parts by weight of a modified polyolefin obtained by reacting an unsaturated carboxylic acid (anhydride)-modified polyolefin with an aminoalcohol represented by the formula $H_2N$—R—OH in which R is an alkylene, arylene or aralkylene group having 18 or less carbon atoms. The olefinic resin composition can give a molded article which can be satisfactorily coated with a coating material without a primer and has excellent heat fusibility to various resin and metals.

15 Claims, No Drawings

1

OLEFIN RESIN COMPOSITION

RELATED APPLICATIONS

This application is a continuation in part of application Ser. No. 08/148,778 filed Nov. 26, 1993, now abandoned, the complete disclosure of which is incorporated herein by reference.

BACKGROUND OF THE INVENTION

This invention relates to an olefinic resin composition. More particularly, it relates to an olefinic resin composition whose molded articles such as an automobile part or the like can be coated without a primer or without a degreasing step in some cases to obtain a molded article having satisfactory coating film performance, and said resin composition is also excellent in heat fusibility to various resins and metals.

Recently, a polypropylene resin or a polymer blend consisting of a polypropylene resin and an olefinic polymer rubber has been widely used in automobile parts, electrical appliance parts and the like. A thermoplastic olefin elastomer of a cross-linked type which is different from a mere polymer blend has been more preferably used than a thermoplastic elastomer of a polymer blend type because the former exhibits higher fluidity and higher heat distortion resistance in the soft flexural modulus region.

Molded articles of these elastomers are often coated; however, these molded articles may be said to have no ability to be coated because the constituents thereof are nonpolar. Accordingly, in the coating of these molded articles, there have generally been adopted the steps of degreasing by washing with a solvent vapor such as trichloroethylene, kerosine, an alcohol or the like, etching, applying a primer, applying a coating material and then baking the coating material. However, since labor-saving in the coating steps and low cost are desired and in particular, from the viewpoint of recent environmental protection, there has strongly been desired development of materials which do not require washing with trichloroethylene vapor or do not require any primer similarly to engineering plastics.

Further, for the same reason as mentioned above, these molded articles are inferior in heat fusibility to other resins, metals and the like, and hence, there is a considerable restriction in adopting such a simple method as two-color molding method or the like, and an improvement in this respect has been strongly desired.

This invention aims at providing a resin composition, the molded article of which does not require any primer in its coating and does not require a degreasing step in some cases and which is excellent in heat fusibility to various resins, metals and the like.

Until now, various proposals and reports have been made as to a method for achieving the good bonding of a coating film to the molded article without a primer in coating process of the molded article, and some of them have been put in practice. They can be broadly classified into the following three methods:

(1) A method of efficiently adding a polar group to the surface of the molded article by a surface treatment, and the surface treatment includes flame treatment, corona discharge treatment, plasma irradiation, ultraviolet ray irradiation and the like.

(2) A method of introducing a polar group into the polymer.

(i) Blending a polymer having a polar group such as EVA, polyamide or the like or forming a polymer alloy with said polymer.

(ii) Blending a polymer modified with an unsaturated carboxylic acid or its derivative, for example, maleic anhydride-modified HDPE, maleic anhydride-modified EVA, maleic anhydride-modified EPR or the like.

(iii) A method of graft-modifying the whole of the composition with an unsaturated carboxylic acid or its derivative in the presence of an organic peroxide, for example, maleic anhydride-modified PP/EPR, maleic anhydride-modified styrene-grafted PP or the like.

(3) A method in which a supplementary effect is calculated (i) Blending a rubber, filler and the like to improve the etching effect or anchoring effect.

(ii) Removing components which tend to bleed to the surface of the molded article and form a weak boundary layer (referred to hereinafter as WBL), such as oligomer of the polymer, additives, oils and the like.

However, the above methods have the following problems:

The method (1) is effective to enhance the productivity of coating and stabilize the quality of product and is used in practice. However, an equipment cost and a running cost are newly required for the improvement of equipment.

The method (2)(i) has such a problem that it is difficult for the polar group to be effectively present on the surface of the molded article and the surface polarity of the molded article is changed with the lapse of time owing to the environment to fail to impart the desired ability to be coated to the surface. Also, the method (2)(iii) has such a problem that the amount of the polar group introduced is restricted and the coating is not sufficiently conducted and that unreacted polar group-containing monomer remains in a large amount in the polymer to cause an odor and corrosion of molds.

The method (3) calculates only a supplementary effect for imparting an ability to be coated to the surface of the molded article and cannot act as a substitute for the primer.

SUMMARY OF THE INVENTION

This invention intends to solve the problems of prior art and aims at providing an olefinic resin composition, the molded article of which has a sufficient ability to be coated with a coating material without using any surface treating means, without requiring any primer or any degreasing step in some cases, and without causing a problem of odor and corrosion of molds, and is excellent in heat fusibility to various resins and metals.

The present inventors have extensive research in order to achieve the above object, and have consequently found that when a specific modified polyolefin is blended with a specific thermoplastic olefin elastomer in a specific proportion, molded articles of the resulting olefinic resin composition can be satisfactorily coated with a coating material without any primer, without requiring any degreasing step in some cases, and without impairing the original properties of the thermoplastic olefin elastomer.

According to this invention, there is provided an olefin resin composition which comprises 100 parts by weight of a thermoplastic olefin elastomer consisting essentially of a polyolefin resin and an olefinic copolymer and 0.5 to 30 parts by weight of a modified polyolefin obtained by reacting a low-molecule polyolefin, having a number average molecular weight of 2000 to 20000 and an amount of double bonds at the terminal or in the molecule of 1.5 or more per 1000 carbon atoms, with an unsaturated carboxylic acid (anhydride) to obtain an unsaturated carboxylic acid (anhydride)-modified polyolefin, and then reacting the unsaturated carboxylic acid (anhydride)-modified polyolefin with an amino alcohol represented by the formula $H_2N-R-OH$ in which R represents an alkylene, arylene or aralkylene group having 18 or less carbon atoms, wherein the polyolefin resin is polypropelene, a random copolymer of propylene and 15 more percent or less of at least one other α-olefin or a block copolymer of propylene and 30 more percent or less of at least one other α-olefin.

DETAILED DESCRIPTION OF THE INVENTION

The thermoplastic olefinic elastomer used in this invention comprises as essential components a polyolefin resin and an olefinic copolymer rubber, and the olefinic copolymer rubber may be present in the uncrosslinked, partially cross-linked or completely crosslinked state in the thermoplastic elastomer.

In this invention, the polyolefin resin includes homopolymers or copolymers of α-olefins having 2 to 20 carbon atoms, and specifically, the following polyolefin resins which include those treated with a peroxide may be used:
(1) Polyethylene (which may be any of low density polyethylene, medium density polyethylene and high density polyethylene),
(2) Copolymers of ethylene and 15 mole % or less of at least one other α-olefin or a vinyl monomer such as vinyl acetate, ethyl acrylate or the like,
(3) Polypropylene,
(4) Random copolymers of propylene and 15 mole % or less of at least one other α-olefin,
(5) Block copolymers of propylene and 30 mole % or less of at least one other α-olefin,
(6) 1-Butene homopolymer,
(7) Random copolymers of 1-butene and 10 mole % or less of at least one other α-olefin,
(8) 4-Methyl-1-pentene homopolymer, and
(9) Random copolymers of 4-methyl-1-pentene and 20 mole % or less of at least one other α-olefin.

The above α-olefins include specifically ethylene, propylene, 1-butene, 4-methyl-1-pentene, 1-hexene, 1-octene and the like. The polyolefin resins are preferably those mentioned in (1) to (4) above.

The olefinic copolymer rubber used in this invention includes amorphous, random, elastic copolymers comprising as a main component at least two α-olefin having 2 to 20 carbon atoms such as copolymer rubber consisting of two or more different α-olefins; a copolymer rubber consisting of two or more different α-olefins and a non-conjugated diene; and the like.

As such olefinic copolymer rubbers, the following rubbers are specifically used:
(i) Ethylene-α-olefin copolymer rubber [ethylene/α-olefin mole ratio=about 90/10 to 50/50],
(ii) Ethylene-α-olefin-non-conjugated diene copolymer rubber [ethylene/α-olefin mole ratio=about 90/10 to 50/50],
(iii) Propylene-α-olefin copolymer rubber [propylene/α-olefin mole ratio=about 90/10 to 50/50] and
(iv) Butene-1-α-olefin copolymer rubber [butene-1/α-olefin mole ratio=about 90/10 to 50/50].

The above α-olefins include those mentioned above as to the polyolefin resin.

The above-mentioned non-conjugated diene includes specifically dicyclopentadiene, 1,4-hexadiene, cyclooctadiene, methylenenorbornene, ethylidenenorbornene and the like.

The Mooney viscosity of the above copolymer ($ML_{1+4}$, 100° C.) is preferably 10 to 350, more preferably 30 to 300.

When the non-conjugated diene is copolymerized, the iodine value (unsaturation degree) of the olefinic copolymer rubber is preferably 16 or less.

Preferable olefinic copolymer rubbers are ethylene-propylene copolymer rubber, ethylene-butene-1 copolymer rubber, propylene-butene-1 copolymer rubber and ethylene-propylene-non-conjugated diene copolymer rubber.

More preferable copolymer rubbers are ethylene-propylene-dicyclopentadiene copolymer rubber and ethylene-propylene-ethylidenenorbornene copolymer rubber.

In the thermoplastic olefin elastomer of this invention, the weight ratio of the polyolefin resin to the olefinic copolymer rubber blended is preferably in the range of 90/10 to 10/90, more preferably 70/30 to 20/80.

The above thermoplastic olefin elastomer may, if necessary, contain 50% by weight or less of a peroxide-noncross-linkable hydrocarbon-based rubbery material, representatives of which are polyisobutene, butyl rubber and the like, and/or a mineral oil.

The preferable thermoplastic elastomer used in this invention includes specifically the following compositions:
(I) A composition obtained by mixing polyethylene, polypropylene or a copolymer of ethylene or propylene and a small amount of at least one other copolymerizable monomer with a partially cross-linked copolymer rubber of ethylene and at least one α-olefin having 3 to 14 carbon atoms or a partially cross-linked ternary or quaternary copolymer rubber obtained by copolymerizing the above copolymer rubber with various polyene compounds. The composition includes, for example, a thermoplastic resin composition obtained by mixing a crystalline polypropylene with a partially cross-linked ethylene-α-olefin copolymer rubber or a partially cross-linked ethylene-α-olefin-non-conjugated diene copolymer rubber at a weight ratio in the range of 70/30 to 20/80 (see, for example, Japanese Patent Application Kokoku No. 53-21,021 and Japanese Patent Application Kokai No. 55-71,738).
(II) A composition obtained by dynamically heat-treating a blend of a polyolefin resin and an ethylene-α-olefin copolymer rubber in the presence of a small amount of a cross-linking agent (see, for example, Japanese Patent Application Kokoku No. 53-34,210, Japanese Patent Application Kokai No. 53-149,240, Japanese Patent Application Kokai No. 53-149,241, Japanese Patent Application Kokoku No. 58-13,091, Japanese Patent Application Kokai No. 2-28,232, Japanese Patent Application Kokai No. 58-34,837 and Japanese Patent Application Kokai No. 1-103,639).
(III) A thermoplastic resin composition obtained by blending a polyolefin resin with the above composition (I) or (II) (see, for example, Japanese Patent Application Kokai No. 53-145,857 and Japanese Patent Application Kokai No. 54-16,554).
(IV) A composition obtained by dynamically heat-treating, in the presence of a small amount of an organic peroxide, a blend of a peroxide-cross-linkable polyolefin resin, representatives of which are homopolymer of ethylene and copolymers of ethylene with a small amount of at least one other polymerizable monomer; a peroxide-noncross-linkable type polyolefin resin, representatives of which are homopolymer of propylene and copolymers of propylene and a small amount of at least one other polymerizable monomers; and an ethylene-α-olefin copolymer rubber (see, for example, Japanese Patent Application Kokai No. 55-71,739).

Preferably used is, for example, a thermoplastic elastomer obtained by dynamically heat-treating a mixture consisting of (a) 60-10 parts by weight of crystalline polypropylene, (b) 40-90 parts by weight of an ethylene-propylene copolymer rubber, ethylene-butene-1 copolymer rubber, propylene-butene-1 copolymer rubber or ethylene-propylene-non-conjugated diene copolymer rubber [(a)+(b)=100 parts by weight] and 5-100 parts by weight of (c) other rubbers and/or (d) a mineral oil, in the presence of an organic peroxide.

The organic peroxide used in the production of such a thermoplastic elastomer includes specifically dicumyl peroxide, di-tert-butyl peroxide, 2,5-dimethyl-2,5-di(tert-butylperoxy)hexane, 2,5-dimethyl-2,5-di(tert-butylperoxy)hexene-3, 1,3-bis(tert-butylperoxyisopropyl)benzene, 1,1-bis(tert-butylperoxy)-3,3,5-trimethylcyclohexane, n-butyl 4,4-bis(tert butylperoxy)valerate, benzoyl peroxide, p-chlorobenzoyl peroxide, 2,4-dichlorobenzoyl peroxide, tert-butylperoxy benzoate, tert-butylperoxy isopropylcarbonate, diacetyl peroxide, lauroyl peroxide, tert-butylcumyl peroxide and the like.

In the partial cross-linking treatment with the above organic peroxide, it is possible to compound a peroxide cross-linking coagent, such as sulfur, p-quinone dioxime, p,p'-dibenzoylquinone dioxime, N-methyl-N,N-dinitrosoaniline, nitrobenzene, diphenylguanidine, trimethylolpropane, N,N'-m-phenylene dimaleimide and the like; divinylbenzene; triallyl cyanurate; a polyfunctional methacrylate monomer, such as ethylene glycol dimethacrylate, diethylene glycol dimethacrylate, polyethylene glycol dimethacrylate, trimethylolpropane trimethacrylate, allyl methacrylate and the like; or a monofunctional vinyl monomer, such as vinyl butyrate, vinyl stearate and the like.

Such a thermoplastic elastomer can be produced by mixing the above-mentioned components, if necessary, dynamically heat-treating, namely melt-mixing, the mixture under an inert gas atmosphere. The mixing apparatus may be a heretofore known one such as an open type mixing roll, a closed type Banbury mixer, an extruder, a kneader, a continuous mixer and the like. Among them, the closed type apparatus is preferably used. The mixing may be conducted at such a temperature that the half-life period of the organic peroxide used becomes less than one minute, preferably 150°–280° C., more preferably 170°–240° C., for a period of preferably 1–20 minutes, more preferably 3–10 minutes.

The modified polyolefin used in this invention is explained below. The modified polyolefin is obtained by a low-molecule polyolefin, having a number average molecular weight of 2,000–20,000 and an amount of double bonds at the terminal or in the molecule of 1.5 or more per 1,000 carbon atoms, with an unsaturated carboxylic acid (anhydride) to obtain an unsaturated carboxylic acid (anhydride)-modified polyolefin, and then reacting the unsaturated carboxylic acid (anhydride)modified polyolefin with an aminoalcohol represented by the formula $H_2N$—R—OH in which R represents an alkylene, arlene or aralkylene group having 18 or less carbon atoms.

The unsaturated carboxylic acid (anhydride) of the unsaturated carboxylic acid (anhydride)-modified polyolefin used includes specifically acrylic acid, methacrylic acid, crotonic acid, maleic acid, cinnamic acid, itaconic acid, citraconic acid, fumaric acid, and unsaturated carboxylic acid anhydrides such as maleic anhydride, itaconic anhydride, citraconic anhydride and the like. Among them, maleic anhydride is preferred.

The modification of the polyolefin with the unsaturated carboxylic acid (anhydride) can be carried out by a method in which an organic peroxide is used.

The amount of the unsaturated carboxylic acid (anhydride) used is preferably 1.5–30% by weight, more preferably 3–10% by weight, based on the weight of the polyolefin.

As the organic peroxide, there may be used those which are generally used as an initiator in radical polymerization. Although the organic peroxide is not critical, it includes the same organic peroxides as used in the production of the above-mentioned partially cross-linked thermoplastic elastomer, and preferable are those that the temperature at which the half-life periods of them become one minute is 100° C. or higher.

The low-molecule polyolefin as a starting material includes the polyolefin resins (1) to (9) mentioned above as to the polyolefin resin. Among them, the copolymers comprising propylene as the main component as mentioned in (3) to (5) above are preferred. That is to say, preferable are those comprising, a polypropylene, a random copolymer of propylene and 15 mole % or less of at least one other α-olefin or a block copolymer of propylene and 30 mole % or less of at least one other α-olefin.

The number average molecular weight of the low-molecule polyolefin is preferably 1,000 to 50,000, more preferably 2,000 to 20,000.

Moreover, the amount of the double bonds of the low-molecule polyolefin is not critical, while the amount is preferably such that 0.5 or more double bonds are present at the terminals or in the molecule per 1,000 carbon atoms. It is more preferable that 1.5 or more double bonds are present at the terminals.

The unsaturated carboxylic acid (anhydride)-modified polyolefin can be prepared by a known method such as a solution method or a melt-mixing method. In the solution method, the unsaturated carboxylic acid (anhydride)-modified polyolefin can be prepared by dissolving the polyolefin and the unsaturated carboxylic acid (anhydride) in an organic solvent, adding an organic peroxide to the solution and heating the resulting mixture. The organic solvent used includes hydrocarbons having 6 to 12 carbon atoms and halogenated hydrocarbons having 6 to 12 carbon atoms. The reaction temperature is preferably a temperature at which the polyolefin used is dissolved. In the melt-mixing method, the modified polyolefin can be prepared by melt-mixing the polyolefin and the unsaturated carboxylic acid (anhydride) with the organic peroxide to subject them to reaction. This can be carried out in an extruder, a Brabender mixer, a kneader, an intensive mixer, a plastomill or the like and the mixing temperature is preferably in the range of the melting point of the polyolefin to 300° C.

Subsequently, the unsaturated carboxylic acid (anhydride)-modified polyolefin is reacted with an aminoalcohol represented the formula $H_2N$—R—OH in which R represents an alkylene, arylene or aralkylene group having 18 or less carbon atoms to obtain a modified polyolefin.

The aminoalcohol includes specifically 2-aminoethanol, 3-amino-1-propanol, 4-amino-1-butanol, aminophenol, aminocresol, aminobenzyl alcohol, aminophenylethyl alcohol, aminonaphthol and the like.

The amount of the modified polyolefin blended is 0.5 to 30 parts by weight, preferably 3 to 30 parts by weight, more preferably 6 to 28 parts by weight, per 100 parts by weight of the thermoplastic olefin elastomer. When the amount is less than 0.5 part by weight, the amount of a polar group introduced becomes small, so that the surface-improving effect is insufficient and a satisfactory ability to be coated is not obtained. When the amount is more than 30 parts by weight, the mechanical properties of the olefinic resin composition are inferior though the ability to be coated is satisfactory.

The composition of this invention may contain, in addition to the above-mentioned components, other additional components in such amounts that the effect of this invention is not greatly impaired. The additional components include inorganic fillers such as talc, calcium carbonate, mica, fibrous filler and the like; additives such as flame retardants, lubricants, antistatic agents, heat-stabilizers, antioxidants and the like; pigments; dispersing agents; etc.

The modified polyolefin used in this invention may be mixed by any of the following methods:

When an uncross-liked or partially cross-linked olefinic copolymer rubber is used, the modified polyolefin may be mixed simultaneously at the mixing step of the olefinic copolymer rubber with the polyolefin resin.

When a blend of the polyolefin resin with the olefinic copolymer rubber is dynamically heat-treated in the presence of a small amount of a cross-linking agent, the modified polyolefin may be mixed as a component of the starting materials before the cross-linking, or alternatively, it may be melt-mixed with the product obtained after the cross-linking. In this case, the polyolefin resin may be additionally mixed.

Incidentally, the melt-mixing of these components may be carried out by any method which is usually used in rubbers, plastics and the like, for example, by means of a single screw extruder, a twin screw extruder, a Banbury mixer, a kneader or the like.

The olefinic resin composition thus obtained can be molded basically in the same manner as in the case of the thermoplastic olefin elastomer which is the base resin of the composition and applied to the same uses as those of the base resin. That is to say, as the molding method, there can be used not only conventional molding methods such as injection molding, extrusion molding, blow molding and the like, but also multicolor molding (two-color injection molding etc.), insert molding and the like.

The olefinic resin composition of this invention can be used to produce exterior and interior trim parts of automobile such as bumper, mudflap, splash shield, air dam skirt, side molding, window weather strip, instrument panel, safety pad, pillar, console box, horn pad, assist grip, radio panel, handle and the like. Also, the olefinic resin composition can be used in household appliance decorating parts and sundries decorating parts. The effect of this invention on the capability of these parts to be coated and the adhesion of a coating film onto the parts can be expected, and among the steps in the conventional coating process, the application of a primer can be omitted and in some cases the degreasing step can also be omitted to obtain a coated molded article having a sufficient coating film adhesion. In addition, the effect of this invention can be expected on adhesion to other resins and metals and on printability.

This invention is explained in more detail below referring to Examples and Comparative Examples, which are merely by way of illustration and not by way of limitation. Incidentally, the test methods used in the Examples and Comparative Examples are as follows:

(1) Method of preparing a test piece

An olefinic resin composition was injection molded at 220° C. to prepare a flat plate of 90 mm in width, 150 mm in length and 2 mm in thickness and this flat plate was used in each test.

(2) Melt flow rate (MFR)

Measured according to JIS K7210 at 230° C. under a load of 2.16 kg.

(3) Surface hardness

Measured according to ASTM D-2240. Shore A or D type. Instant value.

(4) Tensile properties

Measured according to JIS K6301. A JIS No. 3 dumbbell was used and the drawing speed was 200 mm/min.

(5) Flexural modulus

Measured according to JIS K7203. Temperature: 23° C., span: 30 mm, bending rate: 1 mm/min. (6) Izod impact strength Measured according to JIS K7110 at –50° C. with notch. NB means not broken.

(7) Coating test (i) Coating method

The above-mentioned flat plate was subjected to trichloroethylene vapor washing (for 30 seconds) to degrease the plate, then dried at room temperature for 30 minutes or more, coated with a coating material (two-pack urethane R271 manufactured by Nippon Bee Chemical Co., Ltd.) in a thickness of 30 μm and then baked at 99° C. for 30 minutes to form a coating film. The coated flat plate was subjected to evaluation of the coating film after it had been allowed to stand at 23° C. at 60% RH for one day.

(ii) Evaluation (a) Adhesion of coating film

After the coating film was subjected to Crosscut tape test using a cellophane tape, the number of cells remaining unpeeled of 100 cells was calculated and used as indication of the adhesion.

(b) Appearance of coated article Judged visually.

EXAMPLE 1

In a Banbury mixer, 100 parts by weight of an ethylene-propylene-dicyclopentadiene copolymer rubber having a Mooney viscosity ($ML_{1+4}$, 100° C.) of 85, a propylene content of 50% by weight and a dicyclopentadiene content of 4% by weight, 25 parts by weight of polypropylene having a MFR of 10 g/10 min (referred to hereinafter as PP-1) and 0.4 part by weight of 2,5-dimethyl-2,5-di(tert-butylperoxy)hexane were melt-mixed for 12 minutes to dynamically heat-treat them.

Subsequently, 37.5 parts by weight of a paraffinic process oil (Diana Process Oil® PW 380 manufactured by Idemitus Kosan) was added to the resulting mixture and they were mixed for 5 minutes, and the resulting mixture was pelletized by a single screw extruder to obtain dynamically heat treated pellets (referred to hereinafter as Dynamically Heat-Treated Pellets-1). Incidentally, the temperature of the mixture at the completion of the dynamic heat-treatment was about 180° C.

Separately, 5 parts by weight of maleic anhydride and 100 parts by weight of polypropylene having a number average molecular weight of 12,000, a density of 0.89 and 1.6 terminal double bonds per 1,000 carbon atoms were dissolved in xylene and subjected to reaction in the presence of dicumyl peroxide to obtain a maleic anhydride-modified polypropylene having a maleic anhydride content of 4.5% by weight.

This maleic anhydride-modified polypropylene was further reacted with 2-aminoethanol in xylene and the solvent was removed by distillation to obtain a modified polypropylene (referred to hereinafter as Modified Polypropylene A).

In a Bunbury mixer, 100 parts by weight of a thermoplastic olefin elastomer consisting of 73.7 parts by weight of Dynamically Heat-Treated Pellets-1 and 26.3 parts by weight of a propylene-ethylene random copolymer (referred to hereinafter as PP-2) having a MFR of 60 g/10 min and an ethylene content of 3.2% by weight was melt-mixed with 5.3 parts by weight of Modified Polypropylene A at 180° C. to obtain a olefinic resin composition of this invention. The results of evaluation of the olefinic resin composition are shown in the Table.

EXAMPLE 2

The same procedure as in Example 1 was repeated, except that the thermoplastic olefin elastomer was replaced with 100 parts by weight of a thermoplastic olefin elastomer consisting of 77.8 parts by weight of Dynamically Heat-Treated Pellets-1 and 22.2 parts by weight of PP-2 and the amount of Modified Polypropylene A was changed to 11.1 parts by weight, to obtain the results shown in the Table.

EXAMPLE 3

The same procedure as in Example 1 was repeated, except that the thermoplastic olefin elastomer was replaced with 100 parts by weight of a thermoplastic olefin elastomer consisting of 87.5 parts by weight of Dynamically Heat-Treated Pellets-1 and 12.5 parts by weight of PP-2 and the amount of Modified Polypropylene A was changed to 25.0 parts by weight to obtain the results shown in the Table.

COMPARATIVE EXAMPLE 1

The same procedure as in Example 1 was repeated, except that the thermoplastic olefin elastomer was replaced with 100 parts by weight of a thermoplastic olefin elastomer consisting of 70.0 parts by weight of Dynamically Heat-Treated Pellets-1 and 30.0 parts by weight of PP-2 and the Modified Polypropylene A was not added to obtain the results shown in the Table.

TABLE

| | | Example 1 | Example 2 | Example 3 | Comp. Ex. 1 |
|---|---|---|---|---|---|
| Compounding recipe | Dynamically Heat-Treated Pellets-1 | 73.7 | 77.8 | 87.5 | 70.0 |
| | PP-2 | 26.3 | 22.2 | 12.5 | 30.0 |
| | Modified Polypropylene A | 5.3 | 11.1 | 25.0 | — |
| Properties | Surface hardness Shore A | 93 | 94 | 94 | 93 |
| | Surface hardness Shore D | 38 | 40 | 40 | 37 |
| | MFR 230° C., 2.16 kg (g/10 min) | 2.5 | 4.8 | 6.6 | 3.6 |
| | Tensile properties Strength at break (kg/cm$^2$) | 79 | 73 | 58 | 87 |
| | Elongation at break (%) | 490 | 470 | 370 | 470 |
| | Flexural modulus (kg/cm$^2$) | 1280 | 1500 | 1540 | 1130 |
| | Izod impact strength (kg · cm/cm) | NB | NB | NB | NB |
| | Coating film adhesion (number of unpeeled cells) | 39 | 100 | 100 | 0 |
| | Appearance of molded article | Good | Good | Good | Good |

What is claimed is:

1. An olefinic resin composition which comprises 100 parts by weight of a thermoplastic olefin elastomer consisting of a polyolefin resin and an olefinic copolymer rubber and 0.5 to 30 parts by weight of a modified polyolefin obtained by reacting a low-molecular weight polyolefin, having a number average molecular weight of 2,000 to 20,000 and an amount of double bonds at the terminal or in the molecule of 1.5 or more per 1,000 carbon atoms, with an unsaturated carboxylic acid (arthydride) to obtain an unsaturated carboxylic acid (anhydride)-modified polyolefin, and then reacting said unsaturated carboxylic acid (anhydride)-modified polyolefin with an aminoalcohol represented by the formula H$_2$N—R—OH in which R represents an alkylene, arylene or aralkylene group having 18 or less carbon atoms, wherein said polyolefin resin is polypropylene, a random copolymer of propylene and 15 mole % or less of at least one other α-olefin or a block copolymer of propylene and 30 mole % or less of at least one other α-olefin.

2. The olefinic resin composition according to claim 1, wherein the ethylene-propylene-non-conjugated diene copolymer rubber is ethylene-propylene-ethylidenenorbornene copolymer rubber.

3. The olefinic resin composition according to claim 1, wherein the ethylene-propylene-non-conjugated diene copolymer rubber is ethylene-propylene-dicyclopentadiene copolymer rubber.

4. The olefinic resin composition according to claim 1, wherein the ethylene-propylene-non-conjugated diene copolymer rubber has an iodine value of 16 or less.

5. The olefinic resin composition according to claim 1, wherein the polyolefin resin is a resin selected from the group consisting of polyethylene, polypropylene and a copolymer of ethylene or propylene and 15 mole % or less of at least one other α-olefin.

6. The olefinic resin composition according to claim 1, wherein the polyolefin resin is polypropylene, a random copolymer of propylene and 15 mole % or less of at least one other α-olefin or a block copolymer of propylene and 30 mole % or less of at least one other α-olefin.

7. The olefinic resin composition according to claim 6, wherein the at least one other α-olefin is ethylene.

8. The olefinic resin composition according to claim 1, wherein the thermoplastic olefin elastomer contains 50% by weight or less of a mineral oil.

9. The olefinic resin composition according to claim 1, wherein the unsaturated carboxylic acid (anhydride) of the unsaturated carboxylic acid (anhydride)-modified polyolefin is acrylic acid, methacrylic acid, crotonic acid, maleic acid, cinnamic acid, itaconic acid, citraconic acid, fumaric acid, maleic anhydride, itaconic anhydride or citraconic anhydride.

10. The olefinic resin composition according to claim 9, wherein the unsaturated carboxylic acid (anhydride) is maleic anhydride.

11. The olefinic resin composition according to claim 1, wherein the aminoalcohol is 2-aminoethanol, 3-amino-1-propanol, 4-amino-1-butanol, aminophenol, aminocresol, aminobenzyl alcohol, aminophenylethyl alcohol or aminonaphthol.

12. The olefinic resin composition according to claim 11, wherein the aminoalcohol is 2-aminoethanol.

13. The olefinic resin composition according to claim 1 wherein said polyolefin resin is a polypropylene resin, and said olefinic copolymer rubber is ethylene-propylene copolymer rubber.

14. A melt-mixed composition formulated from 100 parts by weight of a thermoplastic olefin elastomer consisting of a polyolefin resin and an olefinic copolymer rubber and 0.5 to 30 parts by weight of a modified polyolefin obtained by reacting a low-molecular weight polyolefin, having a number average molecular weight of 2,000 to 20,000 and an amount of double bonds at the terminal or in the molecule of 1.5 or more per 1,000 carbon atoms, with an unsaturated carboxylic acid (anhydride) to obtain an unsaturated carboxylic acid (anhydride)-modified polyolefin, and then reacting said unsaturated carboxylic acid (anhydride)-modified polyolefin with an aminoalcohol represented by the formula $H_2N-R-OH$ in which R represents an alkylene, arylene or aralkylene group having up to 18 carbon atoms, wherein said polyolefin resin is polypropylene, a random copolymer of propylene and 15 mole % or less of at least one other α-olefin or a block copolymer of propylene and 30 mole % or less of at least one other α-olefin.

15. An interior or exterior trim part of an automobile obtained by molding a composition comprising 100 parts by weight of a thermoplastic olefin elastomer consisting of a polyolefin resin and an olefinic copolymer rubber and 0.5 to 30 pans by weight of a modified polyolefin obtained by reacting a low-molecular weight polyolefin, having a number average molecular weight of 2,000 to 20,000 and an amount of double bonds at the terminal or in the molecule of 1.5 or more per 1,000 carbon atoms, with an unsaturated carboxylic acid (anhydride) to obtain an unsaturated carboxylic acid (anhydride)-modified polyolefin, and then reacting said unsaturated carboxylic acid (anhydride)-modified polyolefin with an aminoalcohol represented by the formula $H_2N-R-OH$ in which R represents an alkylene, arylene or aralkylene group having up to 18 carbon atoms, wherein said polyolefin resin is polypropylene, a random copolymer of propylene and 15 mole % or less of at least one other α-olefin or a block copolymer of propylene and 30 mole % or less of at least one other α-olefin.

* * * * *